UNITED STATES PATENT OFFICE.

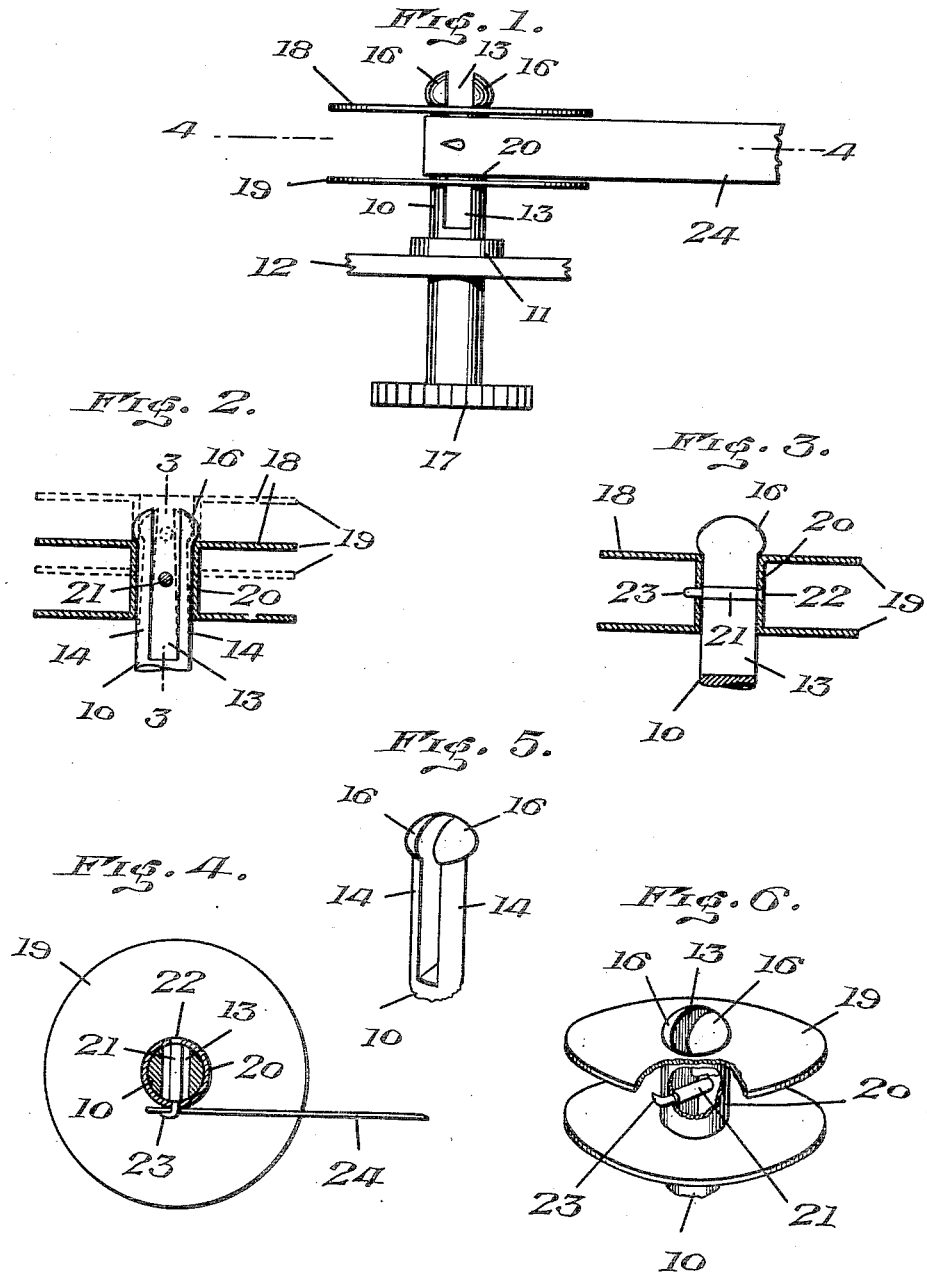

CHARLES SPIRO, OF NEW YORK, N. Y., ASSIGNOR TO GOURLAND TYPEWRITER CORPORATION, OF NEW YORK, N. Y., A CORPORATION OF NEW YORK.

RIBBON-SPOOL.

1,319,429.     Specification of Letters Patent.     Patented Oct. 21, 1919.

Application filed January 18, 1919. Serial No. 271,824.

*To all whom it may concern:*

Be it known that I, CHARLES SPIRO, citizen of the United States, residing at New York, in the county of New York and State of New York, have invented certain new and useful Improvements in Ribbon-Spools, of which the following is a specification.

This invention relates to a ribbon spool and particularly to a construction for retaining the spool against movement upon its supporting and driving post.

The invention has for an object to provide a novel and improved construction of the ribbon spool having holding means extending diametrically across its hub to enter between separated members at the free end of a driving post, together with means upon said post to prevent longitudinal displacement of the spool.

A further object of the invention is to present a novel structure of spool having a cross pin extending diametrically of its hub and provided at one end with means for the attachment of a ribbon thereto.

Other and further objects and advantages of the invention will be hereinafter set forth and the novel features thereof set forth by the appended claims.

In the drawing—

Figure 1 is a side elevation of the invention;

Fig. 2 is a vertical section thereof;

Fig. 3 is a section through the post and spool on line 3—3 of Fig. 2;

Fig. 4 is a cross section on line 4—4 of Fig. 1;

Fig. 5 is a detail perspective of the post; and

Fig. 6 is a similar view of the spool, with the hub in section.

Like numerals indicate like parts in the several figures of the drawing.

The numeral 10 designates the supporting and driving post which may be supported and driven in any preferred manner, for instance, by a collar 11 resting upon a fixed part 12 of the frame of a typewriting machine. This post is preferably formed of resilient or spring material and provided at its free end with a slot 13 forming separated members 14 adapted to yield. The free ends of the members 14 are also formed with a head 16 by which a spool may be retained upon the post against longitudinal displacement. The lower end of this post is provided with a driving wheel or ratchet 17 of any ordinary form.

The spool 18 is formed of the side plates 19 secured together by the cylindrical hub 20 which is provided with a cross pin 21 extending diametrically across said hub to form a locking member adapted to enter the slot in the post and prevent rotative movement of the spool thereon. This pin is mounted in the wall of the hub to extend across its interior opening and may be provided with a head 22 at one end and an attaching hook 23 for the ribbon 24 at its opposite end. In order to permit compression of the free end of the post as the spool is introduced thereover, this pin is formed of less diameter than the slot in the post, such difference in diameter being equal to the enlarged retaining head upon the post.

The operation of the invention will be apparent from the foregoing description and it will be seen that as the spool is forced over the post the enlarged head is compressed by the wall of the spool hub while the holding pin enters the slot in the post, as indicated by dotted lines in Fig. 2. The spool is thus held against longitudinal displacement from the post and also against rotative movement thereon so that it will be positively supported and driven in the movement of the post. This holding pin also provides means by which the ribbon may be attached to the spool, and the pin when disposed in the slot forms a solid and rigid connection with the post.

The invention provides a simple, efficient and economically manufactured form of ribbon spool adapted to be sold with the ribbon and readily and conveniently attached to any ordinary form of ribbon controlling mechanism.

What I claim is—

1. The combination with a slotted post having resilient members at its free end, of a ribbon spool having a tubular hub adapted to compress said members, and a fixed holding member carried by said hub and adapted to seat in said slot and prevent rotation of the spool upon said post.

2. The combination with a slotted post having resilient members at its free end, of a ribbon spool having a tubular hub adapted to compress said members, and a fixed holding pin of less diameter than the slot of said post extended across the interior of said hub and adapted to seat in said slot to prevent rotation of the spool upon the post.

3. A ribbon spool comprising side plates with an intermediate tubular hub having a fixed cross pin extending diametrically across the interior thereof with one end projected beyond the hub to form a ribbon attaching means.

4. The combination with a slotted post having a resilient free end provided with an enlarged head, of a ribbon spool having a tubular hub adapted to compress said head, and a fixed holding pin extending across the interior of said hub to seat in the slot of said post and provided at one end with a ribbon attaching hook at the outer periphery of the hub.

In testimony whereof I affix my signature.

CHARLES SPIRO.